G. S. Prindle,
Piston-Rod Packing.

No. 52,742.  Patented Feb. 20, 1866.

Witnesses:
J. J. Woodward
Joel R. Woodruff

Inventor:
George S. Prindle

UNITED STATES PATENT OFFICE.

GEORGE S. PRINDLE, OF AURORA, ILLINOIS.

IMPROVEMENT IN PISTON-ROD PACKING.

Specification forming part of Letters Patent No. 52,742, dated February 20, 1866.

*To all whom it may concern:*

Be it known that I, GEORGE S. PRINDLE, of the city of Aurora, in the State of Illinois, have invented certain new and useful Improvements in Packing for Stuffing-Boxes; and I do hereby declare the following to be a full and exact description thereof, reference being had to the accompanying drawings, and to the letters and marks thereon.

Figure 2:
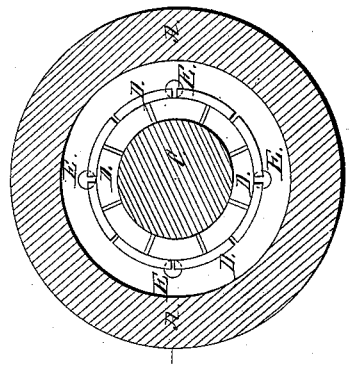
Figure 1:
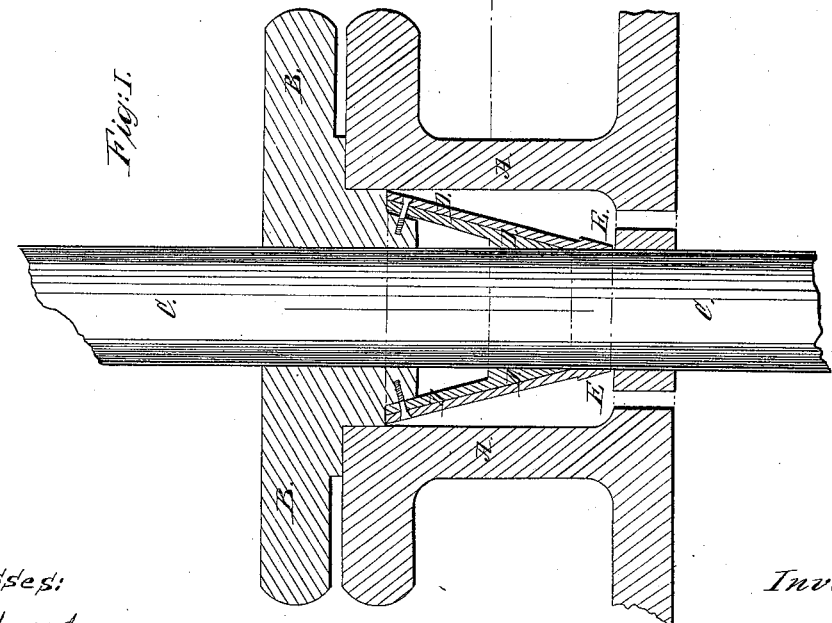

Of the drawings forming part of this specification, Figure 1 is a vertical section of the stuffing-box, gland, rod, and packing; and Fig. 2 is a horizontal section of the same at the intersection of the red line.

In steam-engines an evil of considerable magnitude arises from the necessity that exists of frequently renewing the packing in the stuffing-boxes and the loss of power caused by compressing the packing around the rod sufficiently to prevent the escape of steam. Another evil exists in the use of packing compressed by screws or other mechanical means in the stuffing-boxes of steam-engines, but more especially in locomotive-engines, from the continued pressure of the packing on the rods after steam has been shut off from the engine, causing unnecessary wear of both packing and rods, all of which evils my improvement is designed to remedy.

The nature of my invention consists in the use of two hollow cones, D D, of brass, Babbitt, or other metal, so constructed as that one may fit tightly inside of the other, with the rod C working through the small ends of both, as shown in the drawings, and divided or slitted one or more times from the small end to within a short distance of the large end of the cones, allowing the cones to be compressed around the rod and preventing the passage of steam between the rod and the cones.

The cones are arranged so that the line of division or slit in one comes opposite the solid part of the other, as shown in Fig. 2, breaking joints in the usual manner, and both are fastened to the gland B by screws, or in any manner that will make a steam-tight joint. A steam-tight joint can be made between the gland B and the stuffing-box A by a ground joint or any other means usually employed for such purpose.

Small openings E E are made in the bottom of the stuffing-box A, which allow the steam to enter freely and act upon the cones D D, compressing them around the rod C and preventing the passage of steam between the cones and the rod.

When steam is shut off from the engine the cones, being relieved from pressure, spring open sufficiently to allow the rod to work freely, thus removing all friction and preventing the wear of rod and packing.

Although this improvement is intended to apply more especially to steam-engines, it is applicable in all cases where rods work into pressure, as in water or air pumps, &c.

As above recited, the packing will be compressed around the rod by the pressure of the steam; but, as is evident, if the passages E E be not used to admit the steam, mechanical devices or means may be used to compress the packing around the rod and make a steam-tight joint. Rings with faces next the packing beveled and made adjustable by screws would answer as one set of means for this purpose. Other means would readily be suggested when this manner of using the packing would be preferred.

Having thus fully set forth my invention, what I claim as new, and desire to secure by Letters Patent, is—

Constructing stuffing-box packing of hollow divided or slitted cones, as herein set forth, so that the steam or other pressure shall close the packing-cones around the rod, making a tight joint, while allowing the rod to move freely, and shall open and relieve the rod from friction when the steam or other pressure is removed.

GEORGE S. PRINDLE.

Witnesses:
J. J. WOODWARD,
JOEL R. WOODRUFF.